United States Patent

[11] 3,604,456

[72] Inventor Marvin R. Jones
 Houston, Tex.
[21] Appl. No. 43,456
[22] Filed June 4, 1970
[45] Patented Sept. 14, 1971
[73] Assignee Cameron Iron Works, Inc.
 Houston, Tex.

[54] OPERATOR FOR VALVES OR THE LIKE
 23 Claims, 1 Drawing Fig.
[52] U.S. Cl. .................................................. 137/594,
 137/488, 137/597, 137/613
[51] Int. Cl. .............................................. F16k 31/12
[50] Field of Search ........................................ 137/594,
 488, 597, 613

[56] References Cited
UNITED STATES PATENTS
| | | | |
|---|---|---|---|
| 1,938,958 | 12/1933 | Goldman...................... | 137/488 |
| 2,306,060 | 12/1942 | Jacobsson..................... | 137/488 X |
| 3,227,171 | 1/1966 | Woelfel......................... | 137/488 X |

Primary Examiner—Harold W. Weakley
Attorney—Hyer, Eickenroht & Thompson

ABSTRACT: There is disclosed an operator for a flowline valve wherein the energy for actuating the operator is derived at least in part from fluid pressure variations in the flowline, and in which signals for such operation may be derived from such variations.

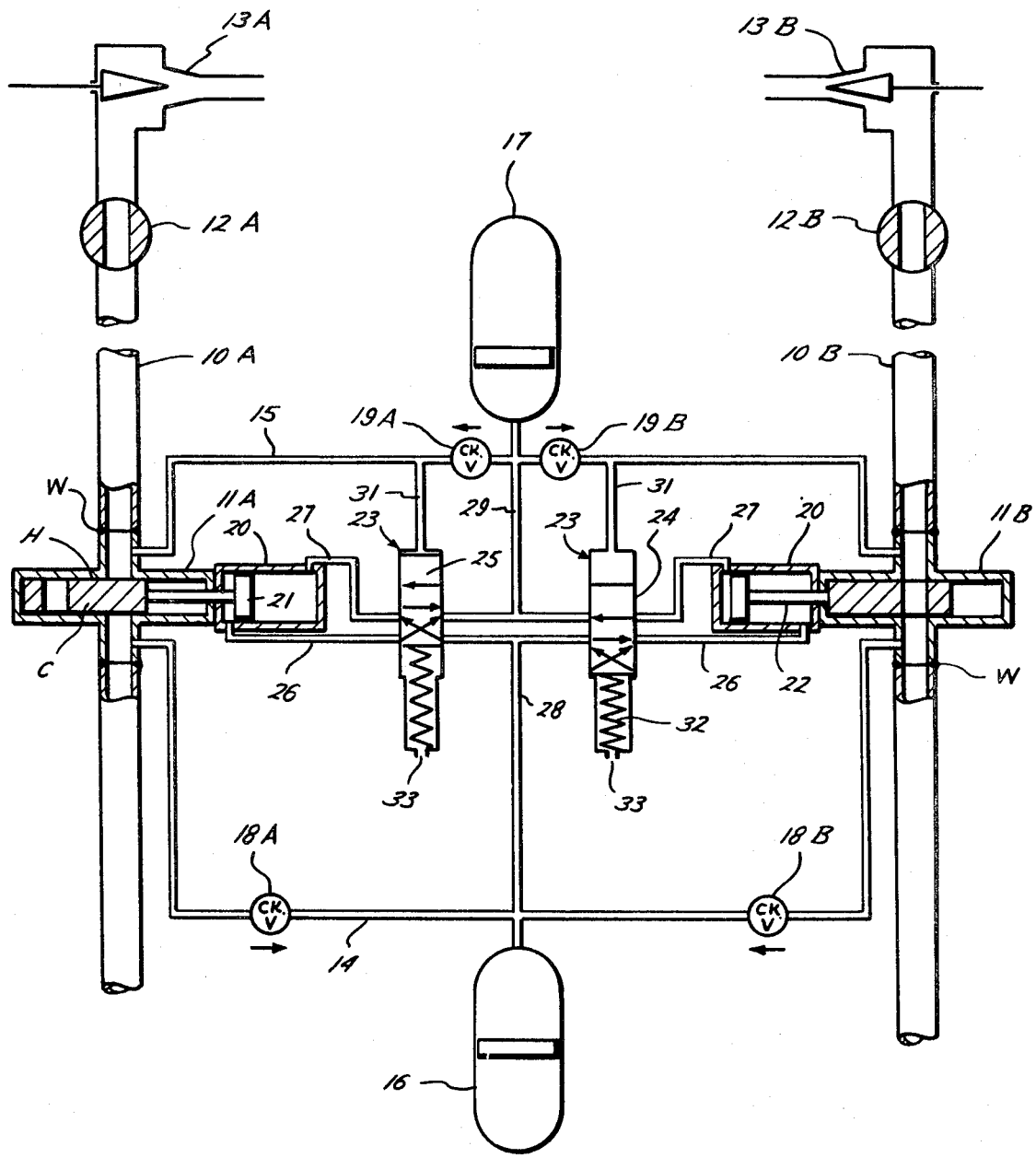

OPERATOR FOR VALVES OR THE LIKE

This invention relates generally to operators for valves, or like two-position mechanism, which are actuated by means of energy derived from pressure variation in a flowline. More particularly, it relates to improvements in valve operators of the type shown and described in a copending application, Ser. No. 874,611, filed Nov. 6, 1969, by John V. Pennington, entitled "Valve Operator," and assigned to the assignee of this application.

In the valve operator of the copending application, two conduits connect the flowline in which the valve is disposed with a four-way valve means which is adapted to reversibly connect the conduits with opposite surfaces of the piston of a reciprocable actuator for moving the closure member of the valve. More particularly, an accumulator is connected to one of these conduits intermediate its connections to the flowline and to the four-way valve means, and a one-way valve means is disposed in the one conduit intermediate its connection to the flowline and the accumulator. Thus, as pointed out in such application, fluid pressure in the accumulator tends to approach one extreme value of pressure variations which occur in the flowline, and thereby provides a differential between it and another value of the flowline pressure for use in moving the closure member between flowline opening and closing positions.

In the illustrated embodiment of the operator of the copending application, the one-way valve means prevents flow from the flowline to the accumulator, so that fluid pressure in the accumulator tends to approach the lowest value which occurs in the flowline. In such an arrangement, a sudden loss of pressure downstream of the closure member while the latter is in open position could drop upstream pressure to a value lower than that stored in the accumulator, and do so before the valve has time to close. Also, a lack of sufficient pressure variation in the flowline could result in an inadequate force for moving the actuator piston. Still further, in the event the operator is at a remote location, as, for example, in the case of a valve in the production tubing of an underwater oil or gas well, it would ordinarily be necessary to actuate the four-way valve means with a source of energy connected thereto by long pressure lines.

An object of this invention is to provide an operator for a valve or the like which, while retaining the advantages of the operator of the copending application, will function despite sudden loss of pressure in the flowline downstream of the closure member.

Another object of this invention is to provide such an operator in which the pressure differential is independent of the value of the flowline pressure at the instant of its operation.

A still further object of the invention is to provide such an operation in which the energy for actuating it is not limited to pressure variations which occur in the flowline being controlled by the valve, but instead may be derived at least in part from pressure variations which occur in another flowline.

Yet a further object of the invention is to provide an operator of such construction as to take maximum advantage of pressure variations within one or more flowlines to which it may be connected.

Still another object of the invention is to provide a valve operator which does not require a supplementary source of energy close to it.

A more particular object is to provide such an operator which is responsive to a predetermined drop in the flowline pressure downstream of a valve closure member, whereby, for example, the production tubing of an underwater well may be closed automatically upon loss of pressure within the tubing downstream of the valve.

These and other objects are accomplished in accordance with the illustrated embodiment of the present invention, by an operator which is similar in construction to the operator of the copending application in that it includes an actuator having first and second oppositely reacting fluid pressure responsive surfaces and means for moving a valve closure member or the like between alternate positions in response to the reaction of said surfaces to pressure differential thereacross, first and second conduits each having an end for connection with a flowline in which fluid pressure variations occur, and a four-way valve means connected between the conduits and the pressure responsive surfaces of the actuator to reversibly connect the conduits and such surfaces for so moving the valve closure member. As was also the case in the prior operator, an accumulator is connected to the first conduit intermediate its connections to the flowline and to the four-way valve means, and a one-way valve means is disposed in the first conduit intermediate its connections to the flowline and the actuator.

However, as distinguished from the prior operator, and in accordance with one novel aspect of the present invention, the one-way valve means is arranged in the first conduit to prevent flow from the accumulator to the flowline, whereby fluid pressure in the accumulator tends to approach the maximum value attained during pressure variations in the flowline. Thus, the operator has the benefit of a substantial pressure differential relative to flowline pressure, particularly when the flowline is exhausted downstream of the valve.

In accordance with the illustrated and preferred form of the invention, a second accumulator is connected to the second conduit, and a one-way valve means is arranged in this second conduit to prevent flow from the flowline to the second accumulator, whereby fluid pressure in the second accumulator tends to approach the minimum value attained during pressure variations in the flowline. This combination of accumulators and one-way valve means in each of the conduits provides a still greater pressure differential relative to flowline pressure for use across the pressure responsible surfaces of the actuator, because the accumulator pressure tend to approach the maximum and minimum pressures in the flowline.

In accordance with another novel aspect of the present invention, at least one of the conduits connects the four-way valve with a flowline other than the flowline controlled by the valve to be operated, whereby it is possible to take advantage of a more extreme value of flowline pressure in the noncontrolled flowline. In the particular illustrated form of this embodiment, both conduits are connected to the other flowline as well as to the flowline being controlled by the operator, whereby the operator is able to utilize the extreme values of pressure variations from both lines.

The four-way valve means may be moved manually between its alternate positions. However, in accordance with still another novel aspect of the invention, it is so moved by means which comprises oppositely reacting fluid pressure responsive surfaces on such four-way valve means. Thus, the four-way valve is urged toward one of its positions by the combined force due to ambient pressure acting upon one of said surfaces and a spring supplementing it and fluid pressure from a suitable source is supplied to the other of said surfaces of the four-way valve means to provide a force greater or less than the combined force so as to selectively open and close the four-way valve.

Preferably, this fluid pressure is supplied through the flowline downstream of the closure member of the valve therein, and a means is provided for restricting the flowline so as to maintain such pressure on the other pressure-responsive surface of the four-way valve means when the supply is discontinued. More particularly, the arrangement is such that the closure member of the valve is urged toward flowline closing position when the force due to the spring and ambient pressure acting on the four-way valve means is greater than the force due to fluid pressure induced in the flowline. Thus, the closure member will automatically close the valve upon a drop in downstream pressure to a predetermined value. This might occur, for example, upon a break in the flowline downstream of the valve, in which case it would be important that the valve close as soon as possible.

The single FIGURE of the drawings, wherein like reference characters are used throughout to designate like parts, is a diagrammatic illustration of the two flowlines each controlled by a valve having an operator constructed in accordance with the preferred embodiment of the present invention.

With reference now to the details of the above-described FIGURE, the flowlines 10A and 10B to be controlled may be production tubing of an underwater well for conveying oil or gas produced from the well to a suitable collection point. The valves to be operated comprise a valve 11A in flowline 10A and a valve 11B in flowline 10B. In accordance with normal practice, flow through the flowlines 10A and 10B may be further controlled by valves 12A and 12B and adjustable chokes 13A and 13B, respectively, in the upper portions thereof.

Each valve includes a housing H having a flowway therethrough fluidly connected as a part of the flowline and a member C movable within the housing for opening and closing the flowway and thus the flowline. As well known in the art, each housing H has tubular ends for connection to the ends of the flowline by welds W or other suitable means.

Although this invention is particularly well suited for the above-described environment, obviously it may be used in other environments, and the particular environment described is merely for illustrative purposes.

The flowways through the valve housings, and thus the flowlines 10A and 10B, are fluidly connected by a conduit 14 on the upstream sides of the closure members of the control valves 11A and 11B, and by a conduit 15 on the downstream sides of the control valves. A first accumulator 16 is connected to conduit 14, and a second accumulator 17 is connected to conduit 15. These accumulators may be of any conventional construction and are therefore shown merely in diagrammatic form.

A first one-way valve 18A is disposed in conduit 14 intermediate flowline 10A and accumulator 16, and a second one-way valve 18B is disposed in such conduit intermediate flowline 10B and accumulator 16. Similarly, a third one-way valve 19A is disposed in conduit 15 intermediate its connection with flowline 10A and accumulator 17, and a fourth one-way valve 19B is disposed in conduit 15 intermediate its connection with flowline 10B and accumulator 17.

Valves 18A and 18B permit flow only toward the accumulator 16, and valves 19A and 19B permit flow only toward flowlines 10A and 10B. Consequently, fluid in the first accumulator 16 will assume the highest pressure which occurs during pressure variations in flowlines 10A and 10B upstream of the control valves, which will usually occur when one of the control valves is closed. On the other hand, fluid in second accumulator 17 will assume the lowest pressure which occurs during fluid pressure variations in flowlines 10A and 10B downstream of the control valves. This low pressure will usually occur when one of the flowlines is relative unrestricted.

The closure members of each of the control valves 11A and 11B are reciprocated between their opened and closed position by means of operators each of which includes, in accordance with the illustrated embodiment of the invention, an actuator comprising a cylinder 20 having a piston 21 reciprocable therein and a rod 22 extending from the piston and through the cylinder for connection with the closure member. In such an actuator, the piston 21 has first and second pressure responsive surfaces on its opposite sides, to which relatively high and low fluid pressures are alternately admitted for reciprocating the piston and thus the closure member, all in a manner to be described below.

For this latter purpose, the operator for each control valve also includes a four-way valve 23 shown diagrammatically in the drawings to include a body 24 having a spool 25 reciprocable therein for alternately admitting high pressure from accumulator 16 and low pressure from accumulator 17 to opposite sides of actuator piston 21. Conduits 26 and 27 connect each four-way valve with opposite ends of cylinder 20.

A conduit 28 connects each four-way valve with conduit 14 intermediate the high pressure accumulator 16 and one-way valve 18A and also intermediate accumulator 16 and one-way valve 18B. Thus, conduit 28 directs the high pressure in accumulator 16 to each of the four-way valves. Similarly, conduit 29 connects conduit 15 intermediate the one-way valves 19A and 19B with four-way valves 23, so as to direct low pressure from accumulator 17 to the four-way valves.

Thus, conduits 14 and 28 constitute a first conduit means, while conduits 15 and 29 constitute a second conduit means, and each four-way valve 23 is connected between the first and second conduit means on the one hand and the first and second pressure responsive surfaces of pistons 21 on the other.

The four-way valve 23 may comprise a conventional pilot operated, spring return, four-way directional control valve, such as the model OD4 series shown in the catalog of Racine Hydraulics and Machinery, Inc. of Racine, Wisconsin, (see Section G, page 6). As illustrated diagrammatically in the drawings, the spool 25 thereof is shiftable within valve body 24 between positions connecting opposite sides of the piston 21 of each cylinder 20 with one or the other of accumulators 16 and 17 which, as previously described, contain pressure at high and low values, respectively.

Thus, for example, spool 25 of four-way valve 23 of the operator for control valve 11A is shown shifted to an upper position to connect conduit 26 leading from the rod end of piston 21 with conduit 29 leading to the low pressure accumulator 17, and conduit 28 leading from the high pressure accumulator 17, and conduit 28 leading from the high pressure accumulator 16 with conduit 27 leading to the piston end of the piston. Consequently, the piston has been urged to position shown for closing valve 11A.

On the other hand, the spool 25 of the four-way valve of the operator for control valve 11B is shifted to its lower position so as to connect the conduit 28 leading from the accumulator 16 to conduit 26 leading to the rod end of piston 21, and conduit 27 leading from the piston end of such piston to conduit 19 leading to accumulator 17. Consequently, the piston has been urged to the position shown to the right for opening valve 11B.

As previously described, the four-way valve of the operator for each control valve may be shifted to the desired position in response to manipulation of the fluid pressure in the flowline downstream of the valve to which the operator is connected. For this purpose, and as shown diagrammatically in the drawing, a pilot pressure conduit 31 extends from conduit 15 between flowline 10A and check valve 19A to the upper end of four-way valve 23 of the operator for valve 11A, and similarly a conduit 31 extends from conduit 15 between flowline 10B and check valve 19B to the upper end of the other four-way valve. Consequently, downstream pressure in one of the flowlines acts over a pressure responsive surface on the upper end of the spool 25 of the operator for the control valve in that flowline to provide a force urging the spool downwardly and thus to the position shown by the right-hand spool. As previously described, in this position of the spool, the piston 21 of the actuator of said operator is moved to a position for opening the control valve for said flowline.

This force urging the spool downwardly is opposed by a force due to environmental fluid pressure acting over a pressure responsive surface on the opposite or lower end of the spool, plus that due to spring 32 engaging such lower end. Thus, the surface of the lower end of each spool is communicated with exterior of the body 24 of the four-way valve through a port 33 so as to be responsive to fluid pressure of the environment in which the four-way is placed, as, for example, subsea pressure in the case of an underwater installation of the character previously described. Spring 32 may therefore be less strong than would otherwise be necessary, and the cavity enclosing the spring may breathe. In any event, the spools 25 of the four-way valves are shifted between alternate positions in response to variations in flowline pressure downstream of valves 11A and 11B.

With the flowline valve closed, as shown in connection with valve 11A, and with valve 12A open and choke 13A restricted, pressure fluid may be supplied through the flowline 10A at a pressure level sufficient to overcome the combined force due to the spring 32 and environmental pressure so as to urge the spool of the four-way valve 23 of the operator for the valve 11A downwardly. As a result, the four-way valve is moved to a position in which fluid pressure causes the closure member of the valve 11A to be moved to open position. Since choke 13A is restricted, relatively high pressure remains in the flowline downstream of the valve 11A and thus prevents valve 11A from returning to closed position.

On the other hand, when it is desired to move the closure member of the valve in one of the flowlines from opened position to closed position, the choke is retracted from restricting position to reduce the fluid pressure in the flowline. This reduces the force due to flowline pressure acting over the upper end of spool 25 of the four-way valve of the operator for such valve to less than the upwardly directed force on the spool, whereby the spool shifts to its upper position for connecting high pressure in accumulator 16 with the rod side of the piston 21 and low pressure from the low pressure accumulator 17 to the piston end of the piston, as a result of which the piston reciprocates to move the closure member of the flowline valve into its closed position.

As previously described, this arrangement of the means for sifting the four-way valve of each operator is preferred, particularly when the operators are used in connection with underwater valves disposed in underwater production tubing or the like, because it will automatically cause such valve to close upon a drop in flowline pressure downstream of the valve.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

The invention having been described, what is claimed is:

1. Apparatus for operating a valve closure member or the like by means of energy derived from a flowline subject to fluid pressure variations, comprising an actuator having first and second oppositely reacting fluid pressure responsive surfaces and means for moving the closure member between alternate positions in response to the reaction of said surfaces to pressure differential thereacross, first and second conduit means each having an end for connection with the flowline, means including four-way valve means connected between said first and second conduit means and said first and second responsive surfaces for movement between alternate positions connecting the first surface with the first conduit means and the second surface with the second conduit means, and connecting the second surface with the first conduit means and the first surface with the second conduit means, means for moving the four-way valve means between said alternate positions, an accumulator connected to the first conduit means intermediate its end for connection to the flowline and the four-way valve means, and one-way valve means arranged in the first conduit means intermediate its end for connection to the flowline and its connection to the accumulator to prevent flow from the accumulator to the flowline, whereby fluid pressure in the accumulator tends to approach the upper extreme value of said pressure variations to provide a differential between the accumulator pressure and another value of the flowline pressure for use in moving the actuator.

2. Apparatus of the character defined in claim 1, wherein said four-way valve means includes a shiftable member having oppositely reacting fluid responsive surfaces, and the means for moving the four-way valve means includes means for supplying fluid pressure to one of said surfaces to urge the member to one position, the other of said surfaces being subject to fluid pressure of the environment in which the four-way valve means is disposed to urge said member to the other position, and spring means engaging said member to also urge it to said other position.

3. In combination with a valve or the like having a flowway therethrough fluidly connectable in a flowline subject to fluid pressure variations, and a closure member movable between positions for opening and closing the flowway, an operator comprising an actuator having first and second oppositely reaching fluid pressure responsive surfaces and means for so moving the member in response to the reaction of said surfaces to pressure differential thereacross, first and second conduit means connecting with the flowway, means including four-way valve means connected between said first and second conduit means and said first and second pressure responsive surfaces for movement between alternate positions connecting the first surface with the first conduit means and the second surface with the second conduit means, and connecting the second surface with the first conduit means and the first surface with the second conduit means, means for moving the four-way valve means between said alternate positions, an accumulator connected to the first conduit means intermediate its connection to the flowway and the four-way valve means, and one-way valve means arranged in the first conduit means intermediate its connection to the flowway and the four-way valve means, and one-way valve means arranged in the first conduit means intermediate its connection to the flowway and its connection to the accumulator to prevent flow from the accumulator to the flowway, whereby fluid pressure in the accumulator tends to approach the upper extreme value of said pressure variations to provide a differential between the accumulator pressure and another value of the flowline pressure for use in moving the actuator.

4. The combination of claim 3, wherein the first and second conduit means connect with the flowway on opposite sides of the closure member.

5. Apparatus for operating a valve closure member or the like by means of energy derived from a flowline subject to fluid pressure variations, comprising an actuator having first and second oppositely reacting fluid pressure responsive surfaces and means for moving the closure member between alternate positions in response to the reaction of said surfaces to pressure differential thereacross, first and second conduit means each having an end for connection with the flowline, means including four-way valve means connected between said first and second conduit means and said first and second pressure responsive surfaces for movement between alternate positions connecting the first surface with the first conduit means and the second surface with the second conduit means, and connecting the second surface with the first conduit means and the first surface with the second conduit means, means for moving the four-way valve means between said alternate positions, first and second accumulators, means connecting said first accumulator to the first conduit means intermediate its end for connection to the flowline and the four-way valve means, means connecting said second accumulator to the second conduit means intermediate its end for connection to the flowline and the four-way valve means, one-way valve means arranged in the first conduit intermediate its end for connection to the flowline and its connection to the first accumulator to prevent flow from the first accumulator to the flowline, and one-way valve means in the second conduit intermediate its end for connection to the flowline and its connection to the second accumulator to prevent flow from the flowline to the second accumulator, whereby fluid pressure in one accumulator tends to approach one extreme value and fluid pressure in the other accumulator tends to approach another extreme value of said pressure variations, the difference between said accumulator pressures providing said differential pressure for use in moving the actuator.

6. Apparatus of the character defined in claim 5, wherein each four-way valve means includes a shiftable member having oppositely reacting fluid responsive surfaces, and said means for moving the four-way valve means includes means for supplying fluid pressure to one of said surfaces to urge the member to one position, the other of said surfaces being subject to fluid pressure of the environment in which the four-way valve means is disposed to urge said member to the other position, and spring means engaging said member to also urge it to said other position.

7. In combination with a valve or the like having a flowway therethrough connectable in a flowline subject to fluid pressure variations, and a closure member movable between positions opening and closing the flowway, an operator comprising an actuator having first and second oppositely reacting fluid pressure responsive surfaces and means for so moving the member in response to the reaction of said surfaces to pressure differential thereacross, first and second conduit means connecting with the flowway, means including four-way valve means connected between said first and second conduit means and first and second pressure responsive surfaces for movement between alternate positions connecting the first surface with the first conduit means and the second surface with the second conduit means, and connecting the second surface with the first conduit means and the first surface with the second conduit means, means for moving the four-way valve means between said alternate positions, a first accumulator connected to the first conduit means intermediate its connection to the flowway and the four-way valve means, a second accumulator connected to the second conduit means intermediate its connections to the flowway and the four-way valve means, one-way valve means in the first conduit intermediate its connections to the flowway and to the first accumulator to prevent flow from the first accumulator to the flowway, and one-way valve means in the second conduit intermediate its connections to the flowway and to the second accumulator to prevent flow from the flowway to the second accumulator, whereby fluid pressure in one accumulator tends to approach one extreme value and fluid pressure in the other accumulator tends to approach another extreme value of said pressure variations, the difference between said accumulator pressures providing said differential for use in moving the actuator.

8. The combination of claim 7, wherein the first and second conduit means connect with the flowway on opposite sides of the member.

9. For use with first and second flowlines, the pressure in said second flowline being subject to variations, apparatus comprising a valve having a flowway connectable in the first flowline and a closure member movable between positions opening and closing the flowway, and an operator for the valve comprising an actuator having first and second oppositely reacting fluid responsive surfaces and means for so moving the closure member in response to the reaction of said surfaces to pressure differential thereacross, first and second conduit means connectable to the second flowline, means including four-way valve means connected between said first and second conduit means and said first and second pressure responsive surfaces for movement between alternate positions connecting the first surface with the first conduit means and the second surface with the second conduit means, and connecting the second surface with the first conduit means and the first surface with the second conduit means means for moving the four-way valve means between said alternate positions, an accumulator connected to the first conduit means intermediate its connections to the second flowline and to the four-way valve means, and one-way valve means arranged in the first conduit means intermediate its connections to the second flowline and to the accumulator whereby fluid pressure in the accumulator tends to approach one extreme value of pressure variations in said second flowline to provide a differential between the accumulator pressure for use in moving the actuator.

10. For use with first and second flowlines, the pressure in said first flowline being subject to variations, apparatus comprising a valve having a flowway connectable in the first flowline and a closure member movable between positions opening and closing the flowway, and an operator for the valve comprising an actuator having first and second oppositely reacting fluid responsive surfaces and means for so moving the closure member in response to the reaction of said surfaces to pressure differential thereacross first conduit means connectable to the first flowline, second conduit means connectable to the second flowline, means including four-way valve means connected between said first and second conduit means and said first and second pressure responsive surfaces for movement between positions connecting the first surface with the first conduit means and the second surface with the second conduit means, and connecting the second surface with the first conduit means and the first surface with the second conduit means, means for moving the four-way valve means between said alternate positions, an accumulator connected to the first conduit means intermediate its connections to the first flowline and to the four-way valve means, and one-way valve means arranged in the first conduit means intermediate its connections to the first flowline and to the accumulator, whereby fluid pressure in the accumulator tends to approach one extreme value of said pressure variations in the first flowline to provide a differential between the accumulator pressure and pressure in the second flowline for use in moving the actuator.

11. For use with first and second flowlines, the pressure in said second flowline being subject to variations, apparatus comprising a valve having a flowway connectable in the first flowline and a closure member movable between positions for opening and closing the valve, and an operator for the valve comprising an actuator having first and second oppositely reacting fluid responsive surfaces and means for so moving the closure member in response to the reaction of said surfaces to pressure differential thereacross, first conduit means connectable to the first flowline, second conduit means connectable to the second flowline, means including four-way valve means connected between said first and second conduit means and said first and second pressure responsive surfaces for movement between positions connecting the first surface with the first conduit means and the second surface with the second conduit means, and connecting the second surface with the first conduit means and the first surface with the second conduit means, means for moving the four-way valve means between said alternate positions, an accumulator connected to the second conduit means intermediate its connections to the second flowline and to the four-way valve means, and one-way valve means arranged in the second conduit means intermediate its connections to the second flowline and to the accumulator, whereby fluid pressure in the accumulator tends to approach one extreme value of pressure variations in said second flowline to provide a differential between the accumulator pressure and pressure in the first flowline for use in moving the actuator.

12. For use with first and second flowlines subject to fluid pressure variations, apparatus comprising a valve having a flowway connectable in the first flowline and a closure member movable between positions for opening and closing the flowway, and an operator for the valve comprising an actuator having first and second oppositely reacting fluid pressure responsive surfaces and means for so moving the closure member in response to the reaction of said surfaces to pressure differential thereacross, first conduit means connectable with each flowline, second conduit means connectable with one of said flowlines, means including four-way valve means connected between said first and second conduit means and said pair of pressure responsive surfaces for movement between alternate positions connecting the first surface with the first conduit means and the second surface with said second conduit means, and connecting the second surface with the first conduit means and the first surface with said second conduit means, means for moving the four-way valve means between said alternate positions, an accumulator connected to the first conduit means intermediate its connections to the first flowline and to the four-way valve means and its connections to the second flowline and to the four-way valve means, and a pair of one-way valve means each being disposed in the first conduit means intermediate its connections to the accumulator and each of its connections to the flowline and arranged so that fluid pressure in the accumulator tends to approach an extreme value of pressure variations in said first and second flowlines to provide a differential between the accumulator pressure and pressure in said one flowline to which the second conduit means is connected for use in moving the actuator.

13. For use with first and second flowlines subject to fluid pressure variations, apparatus comprising a valve having a flowway connectable in the first flowline and a closure member movable between positions for opening and closing the valve, and an operator for the valve comprising an actuator having first and second oppositely reacting fluid pressure responsive surfaces and means for so moving the closure member in response to the reaction of said surfaces to pressure differential thereacross, first and second conduit means each connectable with both flowlines, means including four-way valve means connected between said first and second conduit means and said first and second pressure responsive surfaces for movement between alternate positions connecting the first surface with the first conduit means and the second surface with the second conduit means, and connecting the second surface with the first conduit means, and the first surface with the second conduit means, means for moving the four-way valve means between said alternate positions, a first accumulator connected to the first conduit means intermediate its connections to the first flowline and to the four-way valve means and its connections to the second flowline and to the four-way valve means, a second accumulator connected to the second conduit means intermediate its connections to the first flowline and to the four-way valve means and its connections to the second flowline and to the four-way valve means, a pair of one-way valve means each being disposed in the first conduit means intermediate the first accumulator and each flowline to prevent flow from the first accumulator to the flowlines, and a pair of one-way valve means each being disposed in the second conduit means intermediate the second accumulator and each flowline to prevent flow from the flowlines to the second accumulator, said one-way valve means being arranged so that fluid pressure in each accumulator tends to approach an extreme value of pressure variations in said flowlines to provide said differential for use in moving the closure member.

14. For use with first and second flowlines subject to fluid pressure variations, apparatus comprising a valve having a flowway connectable in the first flowline and a member movable between positions for opening and closing the flowway, a second valve having a flowway connectable in the second flowline and a member movable between positions for opening and closing the flowway, and operators for the valves comprising a pair of actuators each having first and second oppositely reacting fluid pressure responsive surfaces and means for so moving one of the closure members in response to the reaction of said surfaces to pressure differential thereacross, first and second conduit means each connectable with both flowlines, means including four-way valve means connected between said first and second conduit means and said first and second pressure responsive surfaces of each actuator for movement between alternate positions connecting the first surface with the first conduit means and the second surface with the second conduit means, and connecting the second surface with the first conduit means, and the first surface with the second conduit means, means for moving the four-way valve means between said alternate positions, a first accumulator connected to the first conduit means intermediate its connections to the first flowline and to the four-way valve means and its connections to the second flowline and to the four-way valve means, a second accumulator connected to the second conduit means intermediate its connections to the first flowline and to the four-way valve means and its connections to the second flowline and to the four-way valve means, a pair of one-way valve means each being disposed in the first conduit means intermediate the first accumulator and each flowline to prevent flow from the first accumulator to the flowlines, and a pair of one-way valve means each being disposed in the second conduit means intermediate the second accumulator and each flowline to prevent flow from the flowlines to the second accumulator, said one-way valve means being arranged so that fluid pressure in each accumulator tends to approach an extreme value of pressure variations in said flowlines to provide said differential for use in moving the closure members.

15. For use with first and second flowlines, said first flowline being subject to pressure variations, apparatus comprising a valve having a flowway and a closure member movable between positions opening and closing the flowway, and an operator for the valve comprising an actuator having first and second oppositely reacting fluid responsive surfaces and means for so moving the closure member in response to the reaction of said surfaces to pressure differential thereacross, first conduit means connectable to the first flowline, second conduit means connectable to the second flowline, means including four-way valve means connected between said first and second conduit means and said first and second pressure responsive surfaces for movement between positions connecting the first surface with the first conduit means and the second surface with the second conduit means, and connecting the second surface with the first conduit means and the first surface with the second conduit means, means for moving the four-way valve means between said alternate positions, an accumulator connected to the first conduit means intermediate its connections to the first flowline and to the four-way valve means, and one-way valve means arranged in the first conduit means intermediate its connections to the first flowline and to the accumulator, whereby fluid pressure in the accumulator tends to approach one extreme value of pressure variations in the first flowline to provide a differential between the accumulator pressure and pressure in the first flowline for use in moving the actuator.

16. For use with a flowline, apparatus comprising a valve having a flowway therethrough fluidly connected in the flowline and a closure member movable between positions for opening and closing the flowway, means for selectively restricting the flowline at a remote point downstream of the valve for causing pressure variations therein, and an operator for the valve including an operator for the valve indicating an actuator having a pair of oppositely reacting fluid pressure responsive surfaces and means for moving the closure member of the valve between alternate positions in response to the reaction of said surfaces to pressure differential thereacross, first and second conduit means each connected with the flowway, four-way valve means connected between said first and second conduit means and said pair of pressure responsive surfaces for movement between alternate positions connecting said one surface with the first conduit means and said other surface with said second conduit means, and connecting said other surface with the first conduit means and said one surface with said second conduit means, an accumulator connected to the first conduit means, one-way valve means in the first conduit means intermediate its connections to the flowway and the accumulator, the fluid pressure in the accumulator tending to approach one extreme value of said pressure variations to provide a differential between the accumulator pressure and another value of the flowline pressure for use in moving the closure member, means urging the four-way valve means to one of its alternate positions, pressure responsive means urging the said four-way valve means to its other alternate position, and means for connecting the pressure responsive means with the flowline downstream of the closure member, whereby reduction of pressure in said downstream portion of the flowline will cause the actuator to close the valve.

17. Apparatus of the character defined in claim 16, wherein the four-way valve means includes means connecting said conduit means with said pressure responsive surfaces, in said one alternate position of said four-way valve means, to move the closure member to flowline closing position in response to a predetermined drop in flowline pressure.

18. Apparatus of the character defined in claim 16, wherein the means urging the four-way valve means to said one position comprises spring means and means responsive to the fluid pressure of the environment surrounding the four-way valve means.

19. Apparatus of the character defined in claim 18, wherein the first and second conduit means connect with the valve flowway on opposite sides of the closure member, respectively.

20. For use with a flowline, apparatus comprising a valve having a flowway therethrough fluidly connected in the flowline and a closure member movable between positions for opening and closing the flowway, means for selectively restricting the flowline at a remote point downstream of the valve for causing pressure variations therein, and an operator for the valve including an actuator having a pair of oppositely reacting fluid pressure responsive surfaces and means for moving the closure member of the valve between alternate positions in response to the reaction of said surfaces to pressure differential thereacross, first and second conduit means each connected with the flowway, four-way valve means connected between said first and second conduit means and said pair of pressure responsive surfaces for movement between alternate positions connecting one surface with the first conduit means and the other surface with said second conduit means, and connecting said other surface with the first conduit means and said one surface with said second conduit means, means urging the four-way valve means to one of its alternate positions, pressure responsive means urging the said four-way valve means to its other alternate position, and means for connecting the pressure responsive means with the flowline downstream of the closure member and upstream of the restricting means, whereby reduction of pressure in said downstream portion of the flowline will cause the actuator to close the valve.

21. Apparatus of the character defined in claim 20, wherein the four-way valve means includes means connecting said conduit means with said pressure responsive surfaces, in said one alternate position of said four-way valve means, to move the closure member to flowline closing position in response to a predetermined drop in flowline pressure.

22. Apparatus of the character defined in claim 20, wherein the means urging the four-way valve means to said one position comprises spring means and means responsive to the fluid pressure of the environment surrounding the four-way valve means.

23. Apparatus of the character defined in claim 22, wherein the first and second conduit means connect with the valve flowway on opposite sides of the closure member, respectively.

PO-1050
(5/69)

UNITED STATES PATENT OFFICE
CERTIFICATE OF CORRECTION

Patent No. 3,604,456          Dated September 14, 1971

Inventor(s) Marvin R. Jones

It is certified that error appears in the above-identified patent and that said Letters Patent are hereby corrected as shown below:

In the claims, column 6, lines 28-30, cancel "and one-way valve means arranged in the first conduit means intermediate its connection to the flowway and the four-way valve means,".

Signed and sealed this 4th day of April 1972.

(SEAL)
Attest:

EDWARD M. FLETCHER, JR.          ROBERT GOTTSCHALK
Attesting Officer          Commissioner of Patents

PO-1050
(5/69)

UNITED STATES PATENT OFFICE
CERTIFICATE OF CORRECTION

Patent No. 3,604,456      Dated September 14, 1971

Inventor(s) Marvin R. Jones

It is certified that error appears in the above-identified patent and that said Letters Patent are hereby corrected as shown below:

Column 1, line 53, change "operation" to --operator--. Column 2, line 33, change "responsible" to --responsive--; line 34, change "pressure" to --pressures--; line 49, change "comprises" to --comprise. Column 4, line 29, change "17" to --16--; line 38, change "19" to --29--; line 67, after "four-way" insert --valve--. Column 5, line 27, change "sifting" to --shifting--; line 57, before "responsive" insert --pressure--. Column 6, line 14, change "reaching" to --reacting--. Column 7, line 63, cancel "means" (second occurrence); line 72, after "pressure" insert --and another value of the second flowline pressure--. Column 8, line 7, after "thereacross" insert --,--. Column 9, line 6, change "flowline" to --flowlines--. Column 10, line 49, cancel "operator for the valve indicating an". In the Abstract, line 3, after "flowline" change the period to a comma.

This certificate supersedes Certificate of Correction issued Aug. 7, 1973.

Signed and sealed this 20th day of November 1973.

(SEAL)
Attest:

EDWARD M. FLETCHER, JR.
Attesting Officer

RENE D. TEGTMEYER
Acting Commissioner of Patents